April 6, 1965  F. H. SCHLERETH  3,177,422
LOW LEVEL TRANSISTOR CHOPPER CIRCUIT
Filed Dec. 30, 1960

INVENTOR:
FRITZ H. SCHLERETH,
BY Marvin A. Oldenberg
HIS ATTORNEY.

United States Patent Office 3,177,422
Patented Apr. 6, 1965

3,177,422
LOW LEVEL TRANSISTOR CHOPPER CIRCUIT
Fritz H. Schlereth, Syracuse, N.Y., assignor to General
Electric Company, a corporation of New York
Filed Dec. 30, 1960, Ser. No. 79,859
6 Claims. (Cl. 321—45)

The present invention relates to an improved transistor chopper circuit for converting a D.C. input voltage into an A.C. output voltage. More particularly the invention relates to a novel low level transistor chopper circuit of improved sensitivity, having applied thereto input voltages normally no greater than 15 millivolts.

The present invention is an improvement over low level transistor choppers as known to exist in the prior art, one such circuit being disclosed in Figure 5.7 of a textbook entitled, "Transistor Circuit Engineering," edited by Richard F. Shea. In the operation of these prior art circuits, a first transistor is normally employed as an alternating switch to periodically connect the D.C. input voltage to the output load, the switching being performed by a large amplitude square wave switching signal applied to the base electrode. The voltage of the switching signal is required to be much greater than the low level D.C. input voltage for proper transistor operation. Since transistors are not perfect switches, a small residual voltage remains across the transistor when in the "on" or fully conducting condition. The residual voltage produces an undesirable A.C. output component across the load for a zero D.C. input voltage, which imposes a practical limitation on the minimum input voltage that can be applied. Accordingly a second switching transistor, whose characteristics are matched to said first transistor, is connected across the load as a compensating device for reducing the undesirable A.C. output component. The second transistor is operated in opposite phase to the first.

In order to further reduce the unwanted A.C. component, the residual voltage across each transistor is minimized by applying the switching signals between the base and collector electrodes of the transistors, rather than between base and emitter electrodes. This reduces the residual voltage by a factor of about ten to one. In the prior art, this connection has required the employment of a transformer having a center tapped secondary winding in the switching signal circuit. The end terminals of the winding are respectively connected to the base electrodes of the first and second transistors, with the center tap necessarily connected to the ungrounded output terminal.

The use of such ungrounded center tapped transformers has been found to introduce a number of limitations in the prior art circuit operation. Because the two halves of the secondary winding cannot be placed in precise phase opposition, due to distributed capacitances and the like, sharp voltage spikes are applied to the load from the center tap. The spikes which occur at the transition time of the square wave switching signal are alternately positive and negative. They are caused by the two halves of the secondary winding, whose voltages are normally of opposite polarity, momentarily having the same polarity. The spikes so produced have a magnitude equal to the switching voltage applied to the base electrodes which is considerably greater than the output voltage, in the order of 100 to 1 when considering the millivolt input voltages normally employed. Thus, they severely distort the output signal. In addition, the spikes may cause damaging overloading of subsequent amplifier stages.

As a further limitation in the use of the transformers, unless large expensive units of good low frequency response are employed, the square wave switching signals applied to the base electrodes will have a fall-off or drooping characteristic. Such fall-off will result in an undesirable A.C. component in the voltage that is not a function of the D.C. input voltage.

Accordingly, one object of the present invention is to provide a low level transistor chopper circuit of improved sensitivity.

A further object of the present invention is to provide a low level transistor chopper circuit having greatly reduced spikes and undesirable A.C. components in the output.

A still further object of the present invention is to provide a low level transistor chopper coircuit which eliminates the requirement of a transformer in the switching signal circuit.

These and other objects are accomplished in a low level transistor chopper circuit which converts the voltage from a low level D.C. input voltage source into a square wave A.C. voltage across a load, said load and said input voltage source having a common terminal. Said circuit comprises a first and second transistor each having collector, emitter and base electrodes, said first and second transistors being operated as alternating on-off switches by square wave control signals. The collector to emitter path of the first transistor is connected in series with the input voltage and the load, the collector electrode being connected to the uncommon terminal of the input voltage source and the emitter electrode being connected to the uncommon terminal of the load. The collector to emitter path of said second transistor is connected in shunt with the load, the emitter electrode being connected to said uncommon terminal of the said load, the collector electrode being coupled to said common terminal. Control signal means connected to said common terminal is provided to apply said square wave control signals between the base of each of said transistors and said common terminal, said signals being of equal amplitude and opposite phase to cause said first and second transistors to be alternately conducting and non-conducting in an opposing phase relationship. In this manner, the D.C. input voltage is periodically connected to the load at a frequency equal to that of the control signals to provide a square wave A.C. voltage across the load which is proportional to the magnitude of the D.C. input voltage.

The invention will be understood from the following description taken in connection with the accompanying drawings, while the novel and distinct features of the invention are particularly pointed out in the appended claims.

Figure 1:
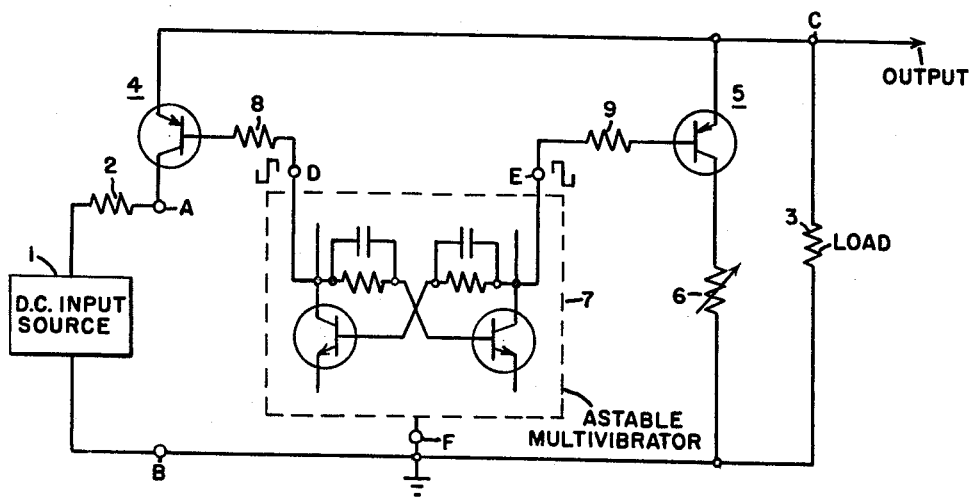
FIGURE 1 illustrates a schematic diagram of applicant's low level transistor chopper circuit.
Figure 2A:
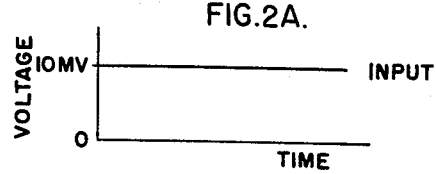
FIGURE 2A illustrates a graph of the input voltage wave form applied in the circuit of FIGURE 1.
Figure 2B:
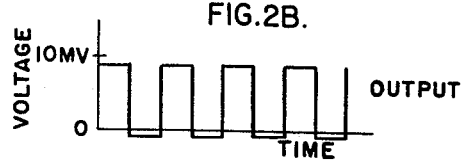
FIGURE 2B illustrates a graph of the output voltage wave form in the circuit of FIGURE 1.

Referring now to FIGURE 1, applicant's low level transistor chopper circuit is shown wherein a D.C. input voltage, illustrated in the graph of FIGURE 2A, is converted at the output into a square wave A.C. voltage, illustrated in somewhat idealized form in the graph of FIGURE 2B. A D.C. input voltage source 1 having an internal resistance 2 is connected between ground and a load 3 by the collector to emitter path of a first PNP transistor 4. The source 1 may take the form of, e.g., a thermocouple, a strain gauge or a battery, providing a voltage of approximately 0–15 millivolts. The collector of said transistor 4 is connected to the ungrounded terminal A of the D.C. input voltage source 1, and the emitter of transistor 4 is connected to the ungrounded terminal C of the load 3. The collector to emitter path of a second, compensating PNP transistor 5 is connected in parallel with the load 3, the emitter electrode of transistor 5 being connected to output terminal C, and the collector electrode of transistor 5 being connected through a compensating resistor 6 to ground. Resistor 6 has a value approximately equal to that of resistor 2 so that the total voltage drop across transistor 5 and resistor 6 is equal to the total drop across transistor 4 and resistor 2 when the transistors are in a conducting state, as will be presently explained in greater detail. A control signal source 7, which typically may be a conventional astable transistor multivibrator such as illustrated in Figure 8.29 of the aforementioned textbook, provides large amplitude switching signals to each of the base electrodes of transistors 4 and 5. A first terminal D of control source 7 is connected through a current limiting resistor 8 to the base electrode of transistor 4; a second terminal E of source 7 is connected through current limiting resistor 9 to the base electrode of transistor 5; and a third terminal F of the source 7 is connected to ground. (The terminals D and E are respectively connected to each of the collector electrodes of the transistors of the multivibrator.) The control signal source applies to the base electrodes of transistors 4 and 5 square wave switching signals of equal amplitude and opposite phase for alternately turning said transistors on and off. The switching signals are of sufficient amplitude, approximately one volt at terminals D and E, to cause a saturated conduction of the transistors when in the on condition.

In one operative embodiment of the circuit of FIGURE 1, the following circuit components were employed, the values being given for purposes of illustration and not to be construed as limiting:

Source 1 _____ 0–15 millivolts, D.C.
Source 7 _____ 1 volt, R.M.S.
Transistors 4 and 5 _____ PNP Type 2N496.
Resistors 2 and 6 _____ 100 ohms.
Resistors 8 and 9 _____ 100K ohms.
Load 3 _____ 5K ohms.

In the operation of the circuit of FIGURE 1, transistor 4 will initially be considered to be conducting and transistor 5 non-conducting, caused by a negative half cycle of the large switching signal applied to the base electrode of transistor 4 and a positive half cycle of the switching signal applied to the base of transistor 5. The base current of transistor 4 divides between the collector and the emitter electrode with the major portion flowing to the collector electrode because of the lower impedance in this path. The total base current is required to be greater than the emitter to collector current for saturated operation of the transistor.

The generated voltage from source 1, minus the small voltage drop across resistor 2 and transistor 4, is impressed on the load. The residual voltage across transistor 4 is a fraction, in the order of 1/10, of the input voltage. At this point in the operation transistor 5 presents an open circuit.

For the succeeding half cycle of operation, a positive switching signal is applied to transistor 4 and a negative signal to transistor 5. Transistor 4 becomes non-conducting and transistor 5 conducts. A compensating voltage appears across the load equal to the small residual voltage across transistor 5 plus the small voltage drop across resistor 6. The operating characteristics of transistor 5 is closely matched to transistor 4 so that the residual voltages developed across the two transistors remain very nearly equal over a wide range of operating conditions. With the values of resistors 2 and 6 about equal, the combined voltage drop across transistor 5 and resistor 6 with transistor 5 fully conducting is made to be approximately equal to the voltage drop across transistor 4 and internal resistance 2 with transistor 4 fully conducting. Accordingly, it may be seen that for zero D.C. input voltage there is essentially no A.C. component in the output. Thus, with a D.C. input voltage applied, the A.C. output voltage is made closely proportional to the magnitude of said D.C. input voltage, as illustrated in FIGURES 2A and 2B.

Accordingly, by means of the present invention, the switching signals may be applied between the base and collector electrodes by a signal source having a common terminal with respect to the input source 1 and the load 3, so that the employment of a center tapped transformer, with its attendant disadvantages, is obviated. Thus, the previously referred to distorting high amplitude positive and negative spikes are eliminated in the square wave output wave form, as may be a drooping characteristic in the wave form caused by a limited low frequency response transformer. It may be appreciated that some noise will still exist in the output due to slight temperature instability and the like, and the intrinsic interelectrode capacitance of the transistor switch causes low amplitude spikes, in the order of a few millivolts. However, by means of the present invention, the output noise level is reduced by several orders of magnitude and an appreciable improvement is obtained in providing an A.C. output voltage which is proportional to the magnitude of the D.C. input voltage.

Although the present invention has been described with reference to a specific embodiment so as to provide a full and complete disclosure, it is not to be limited thereto. Thus, the control signal source may take other forms of a square wave generator, and may include a transformer if desired, but with a grounded center tapped secondary winding. The D.C. input source may be modulated, preferably at a frequency lower than the switching frequency.

The appended claims are intended to include all modifications and variations which fall within the true spirit of the invention.

What I claim as new and desire to secure by Letters Patent of the United States is:

1. A low level transistor chopper circuit for converting the voltage from a direct input voltage source into an alternating output voltage across a load, said load and said input voltage source each having a first terminal and a common terminal, comprising a first and second transistor of matching characteristics each having collector, emitter and base electrodes, the collector to emitter path of said first transistor being coupled in series with said load between said first terminals, the collector to emitter path of said second transistor being coupled in shunt with said load, control signal means for applying first and second control voltages between said common terminal and the base electrodes of said first and second transistors respectively, thereby providing first and second alternating current signals of equal amplitude and opposite phase to the base electrodes of said first and second transistors respectively, said signals causing said first and second transistors to be alternately fully conducting and nonconducting, whereby an alternating output voltage appears across the load which is proportional to the magnitude of the direct input voltage.

2. A low level transistor chopper circuit for converting the voltage from a direct input voltage source into an alternating output voltage across a load, said load and said input voltage source each having a first terminal and a common terminal, comprising a first transistor and second transistor of matching characteristics each having collector, emitter and base electrodes, the emitter electrodes of said first and second transistors being coupled to the first terminal of said load, the collector electrode of said first transistor being coupled to the first terminal of said input voltage source and the collector electrode of said second transistor being coupled to said common terminal, control signal means for applying first and second control voltages between said common terminal and the base electrodes of said first and second transistors respectively, thereby providing first and second alternating current signals of equal amplitude and opposite phase to the base electrodes of said first and second transistors respectively, said signals causing said first and second transistors to be alternately fully conducting and nonconducting, whereby an alternating output voltage appears across the load which is proportional to the magnitude of the direct input voltage.

3. A low level transistor chopper circuit as in claim 2 wherein said control signal means is an astable multivibrator and said alternating current signals are of square wave form.

4. A low level transistor chopper circuit for converting a voltage in the order of 0–15 millivolts from a direct input voltage source into an alternating output voltage across a load, said load and said input voltage source each having a first terminal and a common terminal, comprising a first switching transistor having its collector to emitter path coupled in series with said load between said first terminals with the emitter electrode connected to said first load terminal, control signal means for applying a first control voltage many orders of magnitude greater than said input voltage between the base electrode of said first transistor and said common terminal, thereby providing a first alternating current square wave signal to said base electrode for rendering said transistor conducting and non-conducting so as to periodically couple said input voltage to said load, said first transistor exhibiting a given residual voltage thereacross during periods of conduction, a compensating switching transistor exhibiting said given residual voltage during periods of conduction and having its collector to emitter path coupled in shunt with said load with the emitter electrode of said compensating transistor connected to said first load terminal, said control signal means applying a second control voltage of equal magnitude and opposite phase to said first control voltage between the base electrode of said compensating transistor and said common terminal, thereby providing a second alternating current square wave signal to the base electrode of said compensating transistor for rendering said compensating transistor conducting and non-conducting in opposition to said first transistor so that said compensating transistor during periods of conduction couples across said load a voltage of a desired value related to said given residual voltage, whereby an alternating output voltage appears across the load which is proportional to the magnitude of the direct input voltage.

5. A low level transistor chopper circuit for converting a voltage in the order of 0–15 millivolts from a direct input voltage source of low internal impedance into an alternating output voltage across a load, said load and said input voltage source each having a first terminal and a common terminal, comprising a first switching transistor having its collector to emitter path coupled in series with said load between said first terminals with the emitter electrode connected to said first load terminal, control signal means for applying a first control voltage many orders of magnitude greater than said input voltage between the base electrode of said first transistor and said common terminal, thereby providing a first alternating current square wave signal to said base electrode for rendering said transistor conducting and non-conducting so as to periodically couple said input voltage to said load, said first transistor and said internal impedance exhibiting a given voltage thereacross during periods of conduction, a compensating switching transistor having matching characteristics with said first transistor, a compensating impedance equal to said low internal impedance forming a serial connection with the emitter to collector path of said compensating transistor, said serial connection being coupled in shunt with said load with the emitter electrode of said compensating transistor connected to said first load terminal, said control signal means applying a second control voltage of equal magnitude and opposite phase to said first control voltage between the base electrode of said compensating transistor and said common terminal, thereby providing a second alternating current square wave signal to the base electrode of said compensating transistor for rendering said compensating transistor conducting and non-conducting in opposition of said first transistor so that said compensating transistor during periods of conduction couples across said load a voltage equal to said given voltage, whereby an alternating output voltage appears across the load which is proportional to the magnitude of the direct input voltage.

6. A low level transistor chopper circuit as in claim 5 wherein the base electrodes of said first transistor and said compensating transistor have coupled thereto current limiting resistors for limiting the current of said first and second square wave signals.

References Cited by the Examiner
UNITED STATES PATENTS

| | | | |
|---|---|---|---|
| 2,821,639 | 1/58 | Bright et al. | 307—88.5 |
| 2,922,051 | 1/60 | Bright et al. | 321—35 |
| 3,039,065 | 6/62 | Regis | 331—113 |
| 3,152,306 | 10/64 | Cooper | 331—113 |

LLOYD McCOLLUM, *Primary Examiner.*

SAMUEL BERNSTEIN, *Examiner.*